(12) United States Patent
Miyazono

(10) Patent No.: US 9,822,829 B2
(45) Date of Patent: Nov. 21, 2017

(54) CONTROLLER OF VEHICLE AND VEHICLE

(71) Applicant: TOYOTA JIDOSHA KABUSHIKI KAISHA, Toyota-shi, Aichi-ken (JP)

(72) Inventor: Hideaki Miyazono, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/381,860

(22) Filed: Dec. 16, 2016

(65) Prior Publication Data

US 2017/0198764 A1 Jul. 13, 2017

(30) Foreign Application Priority Data

Jan. 13, 2016 (JP) .................................. 2016-004813

(51) Int. Cl.
*F16D 48/06* (2006.01)

(52) U.S. Cl.
CPC ...... *F16D 48/06* (2013.01); *F16D 2500/1085* (2013.01); *F16D 2500/10412* (2013.01); *F16D 2500/1107* (2013.01); *F16D 2500/30818* (2013.01); *F16D 2500/3114* (2013.01); *F16D 2500/3115* (2013.01); *F16D 2500/507* (2013.01); *F16D 2500/50287* (2013.01); *F16D 2500/70426* (2013.01)

(58) Field of Classification Search
CPC .......... F16D 48/06; F16D 2500/10412; F16D 2500/30428; F16D 2500/30806; F16D 2500/30818; F16D 2500/3114; F16D 2500/3115; F16D 2500/3118; F16D 2500/50287
See application file for complete search history.

(56) References Cited

U.S. PATENT DOCUMENTS

| 4,646,891 A * | 3/1987 | Braun | F16D 48/066 |
|---|---|---|---|
| | | | 192/111.12 |
| 5,337,874 A * | 8/1994 | Oltean | B60W 10/02 |
| | | | 192/111.12 |
| 2011/0153134 A1* | 6/2011 | Rocq | F16D 48/06 |
| | | | 701/22 |

FOREIGN PATENT DOCUMENTS

| EP | 2990630 A1 | 3/2016 |
|---|---|---|
| JP | H02-163520 A | 6/1990 |
| JP | 2014-214678 A | 11/2014 |
| JP | 2015-000686 A | 1/2015 |

* cited by examiner

*Primary Examiner* — Edwin A Young

(74) *Attorney, Agent, or Firm* — Oliff PLC

(57) ABSTRACT

A controller including an electronic control unit, the electronic control unit is configured to determine at least one of whether a first absolute value is at least equal to a first threshold and whether a second absolute value is at least equal to a second threshold. When the electronic control unit determines that at least one of the first absolute value and the second absolute value is at least equal to the corresponding threshold, torque capacity of an automatic clutch is controlled such that the automatic clutch is brought into a slipping state. The first absolute value is an absolute value of rotational acceleration of an input shaft of a transmission, and the second absolute value is an absolute value of rotational acceleration of drive wheels.

5 Claims, 4 Drawing Sheets

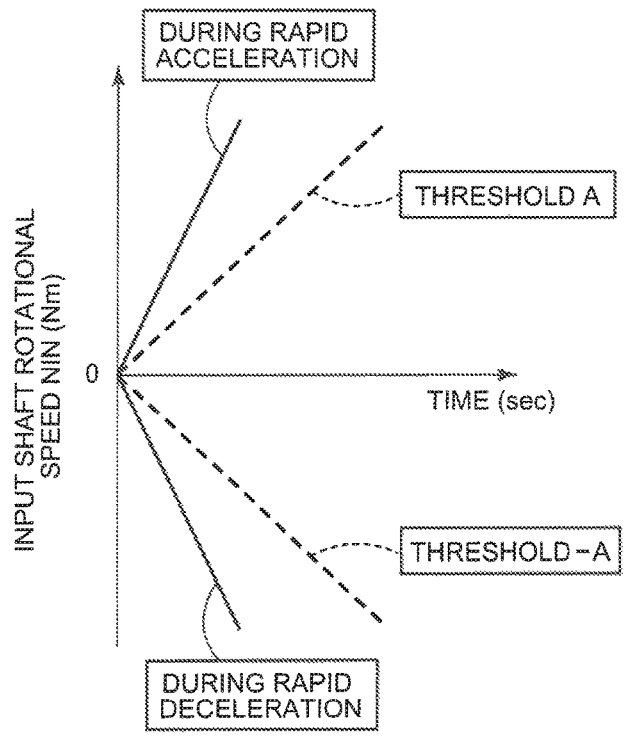
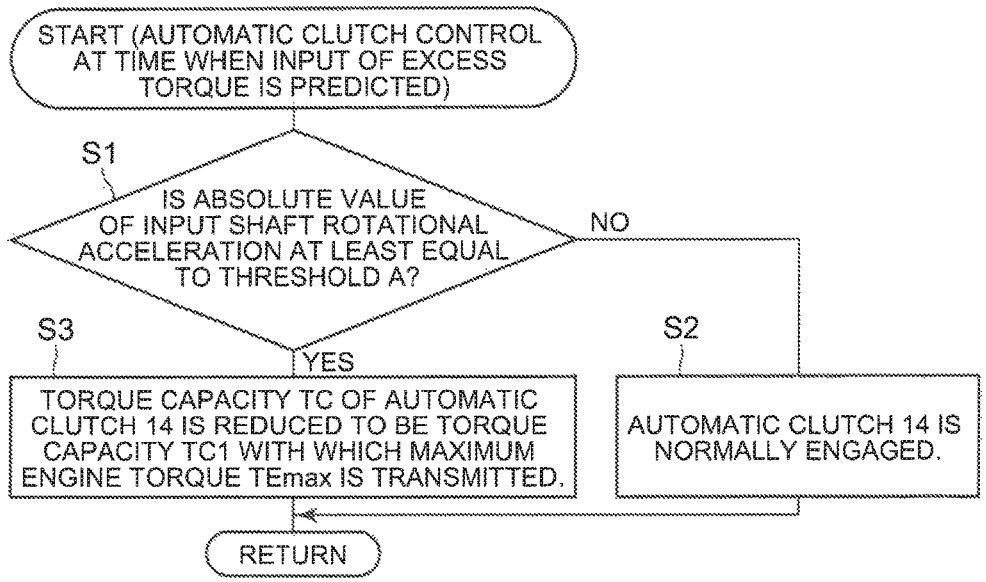

CONTROLLER OF VEHICLE AND VEHICLE

INCORPORATION BY REFERENCE

The disclosure of Japanese Patent Application No. 2016-004813 filed on Jan. 13, 2016 including the specification, drawings and abstract is incorporated herein by reference in its entirety.

BACKGROUND

1. Technical Field

The disclosure relates to a controller for a vehicle and a vehicle and, in particular, to improved responsiveness of the automatic clutch.

2. Description of Related Art

A vehicle that includes an automatic clutch in a power transmission route from a drive source, such as an engine, to drive wheels has been known, and the automatic clutch controls clutch strokes by using an actuator, so as to control torque transmitted between the engine and a transmission. For instance, an automatic clutch described in Japanese Patent Application Publication No. 02-163520 (JP 02-163520 A) is a typical example. In this automatic clutch of JP 02-163520 A, a relationship between engaged torque capacity of the automatic clutch and each of a throttle opening degree, an engine speed, and an input shaft rotational speed is set for each road surface inclination angle, and the engaged torque capacity of the automatic clutch, which is computed from the selected relationship based on the actual road surface inclination angle as well as from the actual throttle opening degree, the actual engine speed, and the actual input shaft rotational speed, is computed for each of the relationships. Then, an engagement amount of the automatic clutch is controlled by using a total sum of the computed engaged torque capacity of the automatic clutch.

In addition, among controllers of the vehicle automatic clutch as described above, a controller of the vehicle automatic clutch that sets clutch torque to be more surplus than actual engine torque in consideration of reduction in the clutch torque caused by thermal expansion of the clutch has been known.

SUMMARY

By the way, when the vehicle travels on a wavelike road, a bumpy road, or the like, the drive wheels repeat spinning in idle and landing. As a result, the entire power transmission route for driving the drive wheels is distorted, and excess torque is transmitted to the transmission and the like. Under this circumstance, in the cases where the torque capacity of the automatic clutch is set to have the surplus in consideration of the thermal expansion and the slight thermal expansion occurs, such inconvenience occurs that the excess torque, which is higher than the torque output from the drive source, is generated in the power transmission route due to the surplus set for the torque capacity of the automatic clutch. In addition, in the cases where a rotational speed of the drive wheel side is higher than the engine speed and the automatic clutch is abruptly engaged during traveling at a high vehicle speed, for example, such inconvenience that the excess torque is generated in the power transmission route also occurs. Generation of the excess torque as described above can be handled by increasing thickness of power transmission mechanisms including the transmission and the like and peripheral components, so as to increase rigidity of the transmission and the like and peripheral components. However, such a problem arises that mass and cost of the vehicle are increased in this case.

The disclosure has been made with the circumstances described above as its background and thus provides a controller of a vehicle automatic clutch capable of suppressing generation of excess torque without increasing mass and cost of a vehicle.

A first aspect of the present disclosure provides a controller for a vehicle, the vehicle including an engine, drive wheels, and an automatic clutch and a transmission interposed in a power transmission route between the engine and the drive wheels. The controller includes an electronic control unit configured to: control torque transmitted between the engine and the transmission; determine at least one of whether a first absolute value is at least equal to a first threshold and whether a second absolute value is at least equal to a second threshold, the first absolute value being an absolute value of rotational acceleration of an input shaft of the transmission, and the second absolute value being an absolute value of rotational acceleration of the drive wheels; and control torque capacity of the automatic clutch such that the automatic clutch is brought into a slipping state, when the electronic control unit determines that at least one of the first absolute value and the second absolute value is at least equal to an corresponding threshold.

According to the configuration, the electronic control unit determines at least one of whether the absolute value of the rotational acceleration of the input shaft of the transmission is at least equal to the predetermined threshold and whether the absolute value of the rotational acceleration of the drive wheels is at least equal to the predetermined threshold. In the case where it is determined that the absolute value of the rotational acceleration of at least one of the input shaft or the drive wheels is at least equal to the threshold, the electronic control unit controls the torque capacity of the automatic clutch such that the automatic clutch is brought into the slipping state. Just as described, in the case where excess torque is to be generated in the power transmission route, generation of the excess torque is thereby suppressed by bringing the automatic clutch into the slipping state. Thus, because the generation of the excess torque is suppressed, required rigidity can be reduced. In other words, thickness of the transmission and that of peripheral components do not have to be increased. Therefore, the generation of the excess torque can be suppressed without increasing mass and cost of the vehicle.

In the controller, the electronic control unit may be configured to maintain the torque capacity of the automatic clutch at limited torque capacity until at least one of the first absolute value and the second absolute value becomes smaller than the corresponding threshold, when the electronic control unit determines at least one of the first absolute value and the second absolute value is at least equal to the corresponding threshold.

According to the configuration, in the case where at least one of a determination that the absolute value of the rotational acceleration of the input shaft is at least equal to the predetermined threshold and a determination that the absolute value of the rotational acceleration of the drive wheels is at least equal to the threshold is made, the electronic control unit maintains the torque capacity of the automatic clutch at the predetermined limited torque capacity until the absolute value of the rotational acceleration of at least one of the input shaft and the drive wheels becomes smaller than the threshold. Therefore, the generation of the excess torque is suppressed by bringing the automatic clutch into the slipping state.

In the controller, the electronic control unit may be configured to select at least one of the first threshold and the second threshold from plural types of thresholds in accordance with an actual gear stage of the transmission.

According to the configuration, the threshold may be selected from the plural types of the thresholds in accordance with the actual gear stage of the transmission. Therefore, the absolute value of the input shaft rotational acceleration of the transmission is determined whether the absolute value of the input shaft rotational acceleration of the transmission is at least equal to the predetermined threshold and thus the input of the excess torque is accurately determined at the time when the excess torque is determined.

A second aspect of the present disclosure provides a vehicle. The vehicle includes an engine, drive wheels, an automatic clutch and a transmission interposed in a power transmission route between the engine and the drive wheels, and an electronic control unit configured to: control torque transmitted between the engine and the transmission; determine at least one of whether a first absolute value is at least equal to a first threshold and whether a second absolute value is at least equal to a second threshold, the first absolute value being an absolute value of rotational acceleration of an input shaft of the transmission, and the second absolute value being an absolute value of rotational acceleration of the drive wheels; and control torque capacity of the automatic clutch such that the automatic clutch is brought into a slipping state, when the electronic control unit determines that at least one of the first absolute value and the second absolute value is at least equal to an corresponding threshold.

In the vehicle, the transmission may be a constant-mesh transmission with parallel shafts, and a gear stage of the constant-mesh transmission is switched in accordance with an operation position of a manually operated shift lever.

According to the configuration, the transmission is the constant-mesh transmission with parallel shafts whose the gear stage is switched in accordance with the operation position of the manually operated shift lever. Accordingly, even when the excess torque is to be generated due to an erroneous operation of the clutch by a driver, the automatic clutch is maintained to have the torque capacity, with which the automatic clutch is brought into the slipping state. Therefore, the generation of the excess torque in the power transmission route can be suppressed without increasing the mass and the cost of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a chart for illustrating thresholds that are used for control actuation of the electronic control unit in FIG. 1 and that are used to predict excess input torque;

FIG. 5 is a flowchart for illustrating main sections of the control actuation of the electronic control unit in FIG. 1.

DETAILED DESCRIPTION OF EMBODIMENTS

A detailed description will hereinafter be made on an embodiment of the disclosure with reference to the drawings. Note that, in the following embodiment, the drawings are appropriately simplified or deformed, and thus dimensional ratios, a shape, and the like of each component are not necessarily shown accurately.

Figure 1:
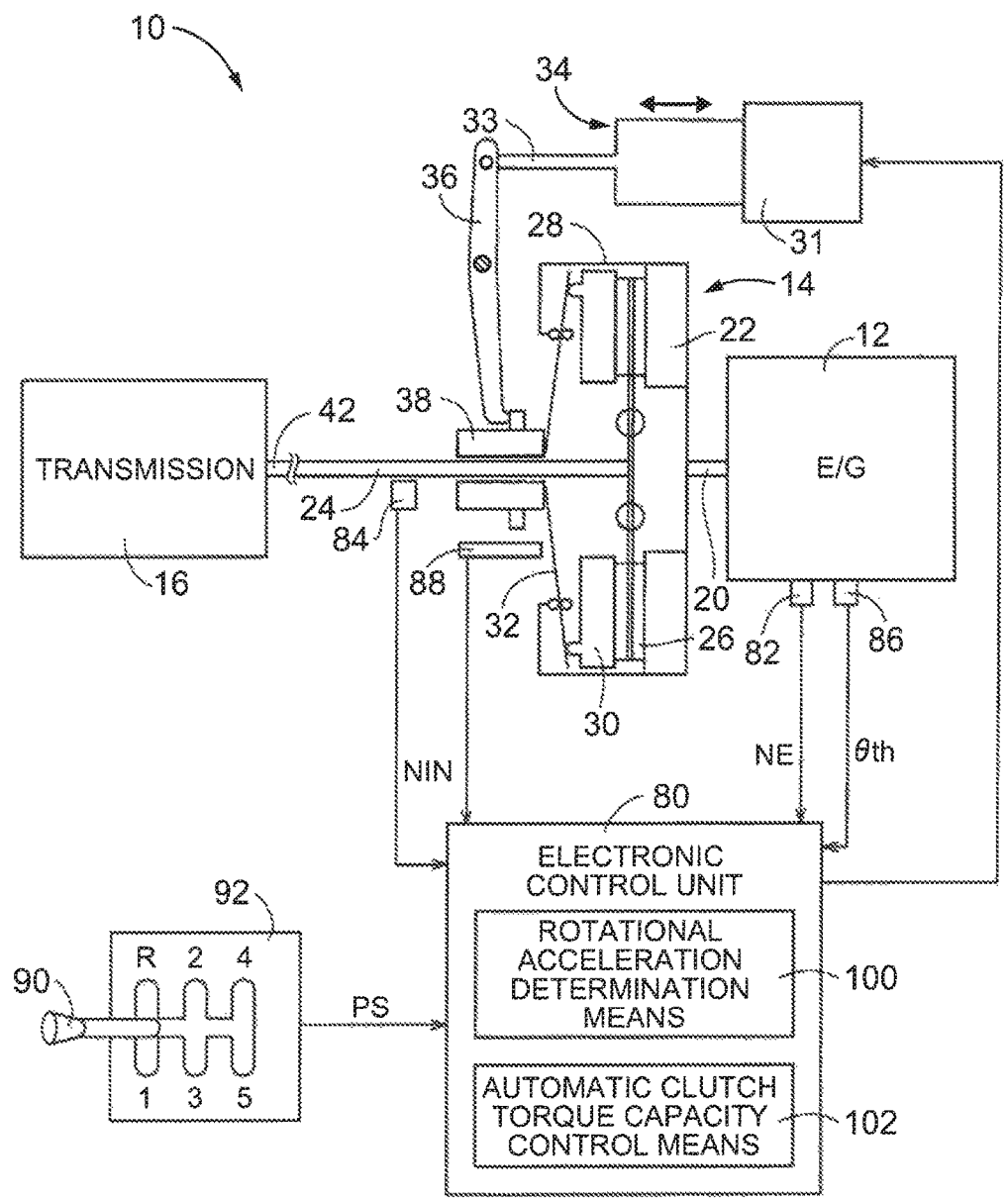
FIG. 1 is a view for illustrating a mechanical configuration of an automatic clutch, which is a part of a vehicle drive unit and to which the disclosure is applied, and an electronic control unit for controlling the automatic clutch.

FIG. 1 is a skeletal view for illustrating a schematic configuration of a vehicle drive unit 10, to which the disclosure is applied, and is a view for schematically illustrating a control configuration for controlling an automatic clutch 14 as a part of the vehicle drive unit 10. As shown in FIG. 1, the vehicle drive unit 10 is used for an FF vehicle, for example, and includes an engine 12 as a travel drive source, the automatic clutch 14, a transmission (automatic transmission) 16, and the like.

The transmission 16 is formed of a constant-mesh transmission with parallel shafts, for example. The transmission 16 is configured that a specified gear stage is established through operations in a shift direction and a selection direction by using an operation force mechanically transmitted from a shift lever 90, which is manually operated and will be described below. Alternatively, the transmission 16 is configured that the specified gear stage is established through the operations in the shift direction and the selection direction by using operation forces output from a shift actuator and a selection actuator, which are not shown.

The automatic clutch 14, which corresponds to the vehicle automatic clutch of the disclosure, is provided between the engine 12 and the transmission 16, and torque capacity thereof is controlled by a clutch actuator 34, which will be described below. In this way, the automatic clutch 14 not only selectively and intermittently disconnects the engine 12 and the transmission 16 but also is brought into a semi-engaged state where the automatic clutch 14 suppresses transmission of excess torque.

The automatic clutch 14 is a friction clutch of a dry single plate type, for example. The automatic clutch 14 is configured by including a flywheel 22, a clutch disc 26, a pressure plate 30, a diaphragm spring 32, the electric clutch actuator 34, and a release sleeve 38. The flywheel 22 is attached to a crankshaft 20 of the engine 12. The clutch disc 26 is connected to a clutch output shaft 24. The pressure plate 30 is provided in a clutch cover 28. The diaphragm spring 32 clamps the clutch disc 26 by urging the pressure plate 30 to the flywheel 22 side for power transmission. The electric clutch actuator 34 has an electric motor 31 and an output rod 33 driven by the electric motor 31. The release sleeve 38 is moved to the flywheel 22 side (a right side in the drawing) by the clutch actuator 34 via a release fork 36, so as to displace an inner end of the diaphragm spring 32 to the flywheel 22 side (the right side in the drawing) and thereby disengage (disconnect) the automatic clutch 14.

For example, when the output rod 33 of the clutch actuator 34 is pulled, the release sleeve 38 is brought into such a state as to be displaced to a side away from the flywheel 22 (a left side in FIG. 1) via the release fork 36. In such a state, the inner end of the diaphragm spring 32 is displaced to the side away from the flywheel 22 (the left side in FIG. 1), and an outer end of the diaphragm spring 32 is displaced to the flywheel 22 side. Accordingly, as the pressure plate 30 presses the clutch disc 26 by an urging force of the diaphragm spring 32, the automatic clutch 14 is completely engaged. Meanwhile, when the output rod 33 of the clutch actuator 34 is pushed out, the release sleeve 38 is brought into such a state as to be displaced to the flywheel 22 side (the right side in FIG. 1) via the release fork 36. In such a state, the release sleeve 38 presses the inner end of the diaphragm spring 32, and the inner end of the diaphragm spring 32 is displaced to the flywheel 22 side (the right side in the drawing). Accordingly, the urging force of the diaphragm spring 32 is reduced. Thus, a force of the pressure plate 30 to press the clutch disc 26 is reduced, and the torque capacity of the automatic clutch 14 is reduced. Once a movement position (a clutch stroke) of the release sleeve 38 reaches a specified value, the pressure plate 30 stops pressing the clutch disc 26, and the automatic clutch 14 is disengaged. In this way, when a push amount of the output rod 33 of the clutch actuator 34 is electrically controlled by a command signal from an electronic control unit 80, the movement position, that is, a clutch stroke SC (mm) of the release sleeve 38 is controlled. Furthermore, torque capacity TC of the automatic clutch 14 is successively changed. Here, the torque capacity TC of the automatic clutch 14 is the transmission torque that can be transmitted by the automatic clutch 14. When excess torque that exceeds the torque capacity TC is added to the automatic clutch 14, the automatic clutch 14 slips and is brought into the semi-engaged state. Thus, the automatic clutch 14 cannot transmit torque that exceeds the torque capacity TC.

Figure 2:
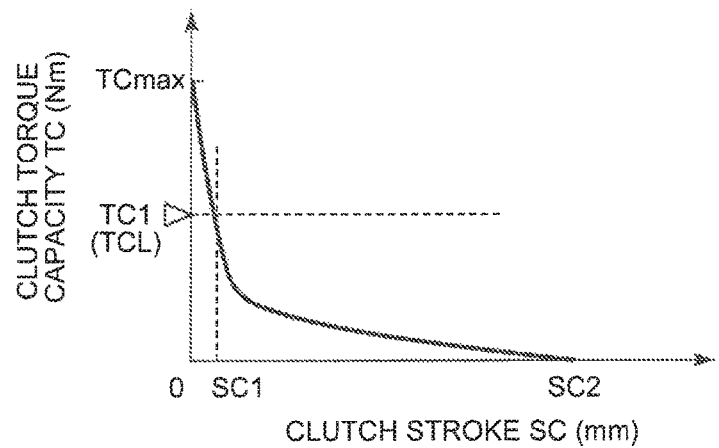
FIG. 2 is a chart for illustrating a relationship between a clutch stroke and torque capacity of the automatic clutch in FIG. 1.

FIG. 2 is a chart for exemplifying a relationship between the torque capacity TC (Nm) and the clutch stroke SC (mm) of the automatic clutch 14. As shown in FIG. 2, in a state where the clutch stroke SC is zero, the torque capacity TC of the automatic clutch 14 has a maximum value. As the clutch stroke SC is increased from zero, the torque capacity TC of the automatic clutch 14 is rapidly reduced in a hyperbolic pattern and is gradually reduced thereafter. When the clutch stroke SC reaches SC2, the torque capacity TC of the automatic clutch 14 becomes zero. The automatic clutch 14 is controlled by the electronic control unit 80, which will be described below, such that the clutch stroke SC becomes zero when the automatic clutch 14 is completely engaged and that the clutch stroke SC becomes at least equal to SC2 described above when the automatic clutch 14 is disengaged. In regard to engagement and disengagement control of the automatic clutch 14 during a gear change, the automatic clutch 14 is disengaged by the electronic control unit 80 in such a manner as to correspond to initiation of the operation of the shift lever 90 in the shift direction or a gripping operation of a shift knob. Then, the automatic clutch 14 is engaged in such a manner as to correspond to termination of the gear change.

In addition, in FIG. 2, torque capacity TC1 indicates the torque capacity corresponding to maximum torque of the engine 12, and a clutch stroke SC1 is the clutch stroke for obtaining the torque capacity TC1. When the electronic control unit 80 detects input of the excess torque, the clutch stroke SC of the automatic clutch 14 is maintained at the predetermined clutch stroke SC1 so that the automatic clutch 14 can be slipped by the excess torque. Then, the torque capacity TC of the automatic clutch 14 is maintained at the predetermined torque capacity TC1.

Figure 3:
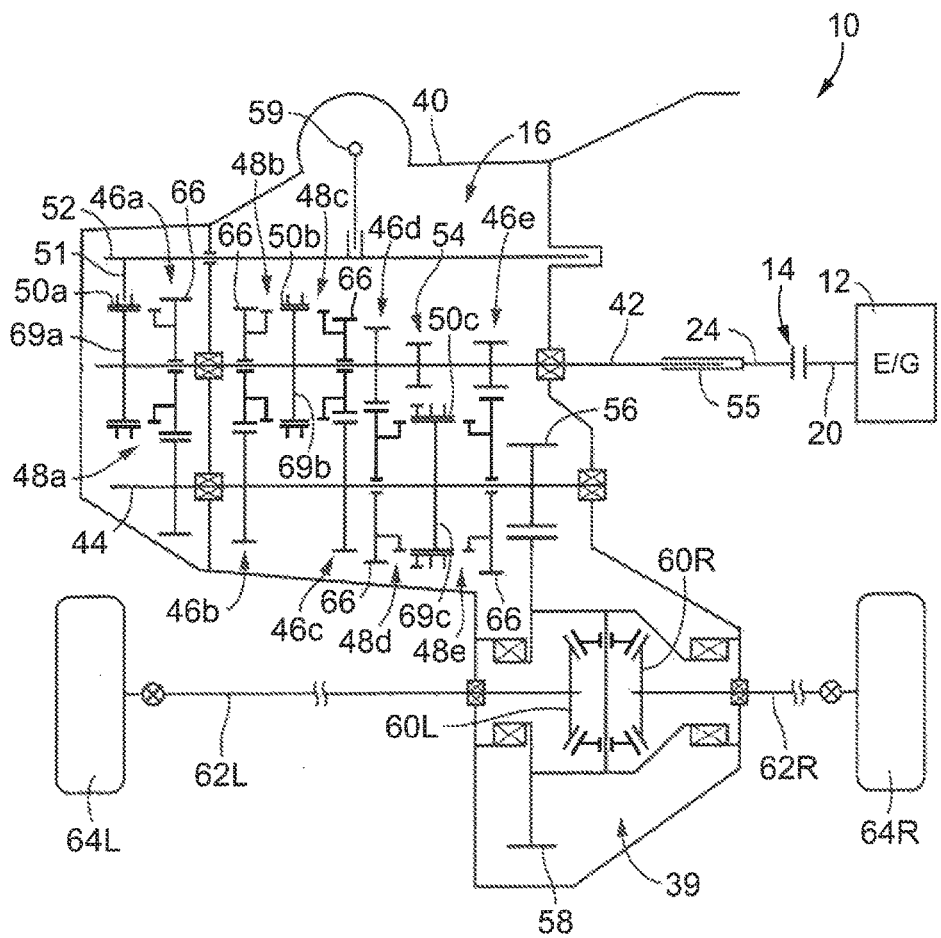
FIG. 3 is a skeletal view for illustrating a configuration of a transmission, which is a part of the vehicle drive unit in FIG. 1, in detail.

FIG. 3 is a skeletal view for illustrating a configuration example of the transmission (automatic transmission) 16. In FIG. 3, the transmission 16 is disposed in a common housing 40 with a differential gear device 39 and constitutes a transaxle. The transmission 16 is immersed in lubricant, a specified amount of which is filled in the housing 40, and is thereby lubricated together with the differential gear device 39. The transmission 16 is the transmission of the so-called a constant-mesh transmission with parallel shafts. Transmission gear pairs (gear pairs) 46a to 46e with different gear ratios are disposed in the transmission 16, and the gear ratio is a ratio of a first gear to a second gear. The first gear is provided between the two parallel shafts that are an input shaft 42 and an output shaft 44 in such a manner as to be relatively rotatable with respect to one of the two parallel shafts. The second gear is provided in such a manner as to not be able to relatively rotate with respect to the other of said two parallel shafts. Furthermore, the transmission 16 is provided with synchronous meshing clutches (synchronous meshing devices) 48a to 48e of a synchronous meshing type, and the synchronous meshing clutches respectively and selectively couple gears on a synchronized side, that is, the first gears of those transmission gear pairs 46a to 46e to the input shaft 42 or the output shaft 44.

The transmission 16 is provided with three forks 51 (the other two are not shown) that are respectively engaged with three clutch hub sleeves (coupling sleeves) 50a, 50b, 50c in such a manner as to be relatively rotatable about an axis of the input shaft 42 or the output shaft 44, and the clutch hub sleeves 50a, 50b, 50c are respectively included in those synchronous meshing clutches 48a to 48e. The three forks 51 selectively move the clutch hub sleeves 50a, 50b, 50c in an axial direction of the input shaft 42 or the output shaft 44 so as to establish any of the gear stages. Furthermore, the transmission 16 is provided with three fork shafts 52 (the other two are not shown) that are parallel to the input shaft 42 and the output shaft 44. A shift and select shaft 59 is provided in a direction that is substantially orthogonal to the fork shafts 52. By following a selecting operation of the shift lever 90 or selecting actuation of the selection actuator, which is not shown, the shift and select shaft 59 is moved to the selection direction that is an axial direction substantially orthogonal to the above fork shafts 52. In this way, the shift and select shaft 59 is selectively engaged with arbitrary one of the above three fork shafts 52. In addition, by following a shift operation of the shift lever 90 or shift actuation by the shift actuator, which is not shown, the shift and select shaft 59 rotates about an axis that is substantially orthogonal to the above fork shafts 52, for example. In this way, the shift and select shaft 59 moves the fork shafts 52 to axial directions of the fork shafts 52, so as to establish the specified gear stage.

A reverse gear pair 54 is disposed on the input shaft 42 and the output shaft 44 in such a manner as to not mesh with each other. A reverse idle gear that is disposed on an unillustrated countershaft meshes with each gear of the reverse gear pair 54 and thereby establishes a reverse gear stage. Here, the input shaft 42 is coupled to the clutch output shaft 24 of the automatic clutch 14 via a spline-fitting joint 55. Meanwhile, an output gear 56 is disposed on the output shaft 44 and meshes with a ring gear 58 of the differential gear device 39. The differential gear device 39 is of a bevel gear type, and drive shafts 62R, 62L are respectively coupled to paired side gears 60R, 60L by spline-fitting or the like. Right and left front wheels (drive wheels of the vehicle) 64R, 64L are rotationally driven by the drive shafts 62R, 62L. Note that FIG. 1 is a development view in which the axes of the input shaft 42, the output shaft 44, and the ring gear 58 are shown in a common plane.

The shift and select shaft 59 is positioned to a first selection position, a second selection position, or a third selection position, at which the shift and select shaft 59 is selectively engaged with the arbitrary one of the three fork shafts 52 by a stroke of the unillustrated selection actuator as described above. For example, in this embodiment, the first selection position is a position at which the shift and select shaft 59 can be engaged with the clutch hub sleeve 50c via the fork shaft 52 and the fork 51. The second selection position is a position where the shift and select shaft 59 can be engaged with the clutch hub sleeve 50b. The third selection position is a position where the shift and select shaft 59 can be engaged with the clutch hub sleeve 50a.

In addition, the shift and select shaft 59 rotates about the axis that is substantially orthogonal to the fork shafts 52 by a stroke of the unillustrated shift actuator as described above. In this way, the shift and select shaft 59 is positioned at a first shift position, a second shift position, or a neutral position. For example, in this embodiment, the first shift position is a position at which the clutch hub sleeves 50a, 50b, 50c are moved in a right direction in FIG. 1 via the fork shafts 52 and the forks 51 and one of the synchronous meshing clutches 48a, 48c, 48e is engaged. The second shift position is a position at which the clutch hub sleeves 50b, 50c are moved in a left direction in FIG. 1 and the synchronous meshing clutch 48b or 48d is engaged. The neutral position is a position at which none of the synchronous meshing clutches 48a to 48e is engaged and is brought into a neutral state.

In the first shift position of the above first selection position, the meshing clutch 48e is coupled, and a first gear stage G1, at which the gear ratio (=a rotational speed NIN of the input shaft 42/a rotational speed of the output shaft 44) is the highest, is thereby established. In the second shift position of the first selection position, the meshing clutch 48d is coupled, and a second gear stage G2, at which the gear ratio is the second highest, is thereby established (see FIG. 3). In the first shift position of the second selection position, the meshing clutch 48c is coupled, and a third gear stage G3, at which the gear ratio is the third highest, is thereby established. In the second shift position of the second selection position, the meshing clutch 48b is coupled, and a fourth gear stage G4, at which the gear ratio is the fourth highest, is thereby established. The gear ratio of this fourth gear stage G4 is approximately one. In the first shift position of the third selection position, the meshing clutch 48a is coupled, and a fifth gear stage G5, at which the gear ratio is the lowest, is thereby established. In the second shift position of the third selection position, the reverse gear stage is established.

Returning to FIG. 1, the electronic control unit 80 is configured by including a microcomputer. The electronic control unit 80 processes signals on the basis of a program that is stored in a ROM in advance while using a temporary storage function of a RAM. The electronic control unit 80 receives a signal indicative of an engine speed NE (rpm) from an engine speed sensor 82, a signal indicative of a rotational speed of the clutch output shaft 24, that is, the rotational speed NIN (rpm) of the input shaft 42 or a rotation angular speed ω (rad/sec) of the transmission 16 from an input shaft rotational speed sensor 84, a signal indicative of a throttle valve opening degree 0th (%) from a throttle valve opening degree sensor 86, a signal indicative of the actual clutch stroke SC (mm) from a clutch stroke sensor 88, a signal indicative of an operation position PS of the shift lever 90 from a shift operation device 92 that includes the shift lever 90 and the like. In addition, the electronic control unit 80 receives a signal indicative of a vehicle speed V from a vehicle speed sensor, which is not shown, a signal indicative of an engine coolant temperature Tw of an engine coolant from an engine coolant temperature sensor, a signal indicative of an intake air amount Q from an intake air amount sensor, a signal indicative of an accelerator pedal operation amount Ace from an accelerator pedal operation amount sensor, a signal indicative of ON/OFF of a foot brake from a brake switch, and the like.

The electronic control unit 80 processes the above received signals in accordance with the program that is stored in advance. For example, the electronic control unit 80 controls a fuel injection amount and injection timing of an unillustrated fuel injection valve of the engine 12, controls ignition timing of an ignition plug by an unillustrated igniter, controls the opening degree 0th for opening/closing of the electronic throttle valve by a throttle actuator, such as an electric motor. In this way, the electronic control unit 80 controls an output state of the engine 12. In addition, the electronic control unit 80 controls an engagement state of the automatic clutch 14 during control of a manual gear change or an automatic gear change of the transmission 16, which corresponds to a traveling state. Furthermore, the electronic control unit 80 executes free running control in which the automatic clutch 14 is disengaged during an inertia travel at a specified vehicle speed or higher or during a decelerating travel. Note that the engagement/disengagement and the torque capacity of the automatic clutch 14 are controlled by the command signal that is supplied from the electronic control unit 80 to the electric motor 31 of the clutch actuator 34.

Next, a description will be made on main sections of a function of the electronic control unit 80 for controlling the torque capacity of the automatic clutch 14, which is executed when input of the excess torque is predicted, by using a functional block diagram in FIG. 1. The electronic control unit 80 includes rotational acceleration determination means 100 and automatic clutch torque capacity control means 102.

Based on a fact that the automatic clutch 14 is completely engaged (the torque capacity has the maximum value) or that input shaft rotational acceleration |d(NIN)/dt| of the transmission 16 is at least equal to a threshold (a rotational acceleration determination value) A, which is defined and stored in advance, during a travel of the vehicle, during which the automatic clutch 14 is operatively engaged, the rotational acceleration determination means 100 determines whether the input of the excess torque to the transmission 16 is predicted. This excess torque is temporarily input from the front wheels 64R, 64L to a power transmission route, which runs from the engine 12 to the front wheels 64R, 64L, when the vehicle travels on a bumpy road surface at a relatively high speed, the front wheels 64R, 64L as the drive wheels come off the road surface and spin in idle, and the torque is rapidly reduced. The excess torque is also temporarily input from the front wheels 64R, 64L to the power transmission route, which runs from the engine 12 to the front wheels 64R, 64L, when the front wheels 64R, 64L, which spin in idle, come in contact with the road surface, rotational speeds thereof are rapidly reduced, and the torque is rapidly increased. The above excess torque is an absolute value of torque change width that exceeds the maximum torque of the engine 12, for example. For example, in the cases where an erroneous downshift is made from the fifth gear stage G5 to the low-speed side first gear stage G1 and the automatic clutch 14 is rapidly engaged during a travel at a high vehicle speed, the excess torque is generated in the power transmission route including the transmission 16. A reason for generation of the excess torque is that the rotational speed NIN of the input shaft 42 is rapidly changed due to a change in the gear ratio.

Here, the threshold (the input shaft rotational acceleration determination value) A is a value that is related to maximum torque TEmax of the engine 12. Furthermore, as will be described below, the threshold is set in advance to the same value as maximum rotational acceleration βmax of the input shaft 42 at a time when the maximum torque TEmax of the engine 12 is added thereto. First, the maximum torque of the engine 12 is represented as TEmax (Nm), gear ratios of the transmission 16 and the differential gear device 39 are represented as γ, a tire radius is represented as r (m), vehicle weight is represented as M (kg), maximum rotational acceleration of a tire (the wheel) is represented as δmax (rad/sec$^2$), acceleration of the vehicle is represented as αmax (m/sec$^2$), and the maximum rotational acceleration of the input shaft 42 is represented as βmax (rad/sec$^2$). In this case, the maximum acceleration αmax of the vehicle, which is obtained by the maximum torque TEmax of the engine 12, is expressed by the following equation (1) from Newton's second law of motion. Next, the maximum rotational acceleration δmax of each of the front wheels 64R, 64L as the drive wheels is expressed by the following equation (2). Furthermore, the maximum rotational acceleration βmax(=d(NIN)max/dt) of the input shaft 42 is expressed by the following equation (3).

$$\alpha max = TEmax \times \gamma / r / M \quad (1)$$

$$\delta max/r = TEmax \times \gamma /(M \times r^2) \quad (2)$$

$$\beta max = \delta max \times \gamma = TEmax \times /(M \times r^2) \quad (3)$$

The threshold A is the rotational acceleration determination value used to determine that the excess torque, for example, the excess torque that is at least equal to the maximum torque TEmax of the engine 12 is added to the transmission 16 from the front wheels (the drive wheels) 64L, 64R. In addition, based on the maximum rotational acceleration βmax, which is generated on the input shaft 42 when the excess torque corresponding to the maximum torque TEmax of the engine 12 is added to the transmission 16, the threshold A is determined to be a value corresponding to the maximum rotational acceleration βmax or a value that is adjusted by adding a margin to the maximum rotational acceleration βmax. The excess torque is added to the transmission 16 from the front wheels (the drive wheels) 64L, 64R. The threshold A is a function of the gear ratio γ of each of the transmission 16 and the differential gear device 39 as expressed by the equation (3). Alternatively, one type of a value may be determined on the basis of the gear ratio γ corresponding to the gear stage of the transmission 16 during a travel, during which the input of the excess torque becomes problematic, and the value may be used as the threshold A. Furthermore, the threshold A may be selected from plural types of values, which are respectively computed in advance for the gear stages of the transmission 16, in accordance with the actual gear stage of the transmission 16. A design value or an experimental value is used for the above maximum torque TEmax of the engine 12.

FIG. 4 is a time chart for illustrating a determination of the threshold of rotational acceleration d(NIN)/dt of the input shaft 42 by the rotational acceleration determination means 100, which is related to initiation of the input of the excess torque. FIG. 4 is a two-dimensional coordinate that includes a horizontal axis indicating time and a vertical axis indicating the rotational speed NIN of the input shaft 42, in which the threshold (the rotational acceleration, that is, inclination) A is indicated by a broken line and a change in the rotational speed NIN of the input shaft 42 from a certain time point is indicated by a solid line. In FIG. 4, a case where the rotational speed NIN of the input shaft 42 is changed to a positive side and a case where the rotational speed NIN of the input shaft 42 is changed to a negative side are indicated by the solid line on a common time axis, and the threshold A on the positive side and the threshold −A on the negative side are indicated by the broken line. An upper side of FIG. 4 shows the rotational acceleration during rapid acceleration during which inclination of the rotational speed NIN of the input shaft 42 is positive (for example, at a time when the automatic clutch 14 is rapidly engaged while having significant downshifting width or at a time when the drive wheel separates from the road surface and spins in idle during a travel on a bumpy road). The rotational acceleration during the rapid acceleration has the same inclination or greater inclination than that of the broken line, which indicates the threshold A. Thus, a state where the input of the excess torque is predicted is indicated. A lower side of FIG. 4 shows the rotational acceleration (a negative value) during rapid deceleration during which the inclination of the rotational speed NIN of the input shaft 42 is negative (for example, at a time when the drive wheel that spins in idle comes in contact with ground during the travel on the bumpy road). The rotational acceleration during the rapid deceleration has the same inclination or greater inclination than that of the broken line, which indicates the threshold −A. Thus, the state where the input of the excess torque is predicted is indicated. In conclusion, when such a determination that the absolute value of the rotational acceleration d(NIN)/dt of the input shaft 42 is at least equal to the threshold A is made, the determination is followed by the input of the excess torque.

From the above example, based on the fact that the input shaft rotational acceleration |d(NIN)/dt| (the absolute value) of the transmission 16 is at least equal to the threshold (the rotational acceleration determination value) A, the rotational acceleration determination means 100 determines whether the input of the excess torque to the transmission 16 is predicted. At this time, the rotational acceleration determination means 100 may only make the determination on the positive side or the determination on the negative side. The threshold A is the value that is defined and stored in advance.

When the input of the excess torque to the transmission 16 is predicted by the determination made by the rotational acceleration determination means 100, the automatic clutch torque capacity control means 102 controls the torque capacity TC of the automatic clutch 14, which is maintained at maximum torque capacity TCmax, to be reduced. Accordingly, in conjunction with an increase in torque, which is caused by the input of the excess torque, the automatic clutch 14 is brought into a slipping state, that is, the clutch disc 26 slips. Then, the automatic clutch torque capacity control means 102 generates a rotational speed difference between the flywheel 22 and the clutch output shaft 24, which is caused by slippage of the clutch disc 26, and generates torque in predetermined limited torque capacity TCL. For example, when the input of the excess torque to the transmission 16 is predicted by the rotational acceleration determination means 100, the automatic clutch torque capacity control means 102 reduces the torque capacity of the automatic clutch 14 and maintains the torque capacity at the limited torque capacity TCL. This limited torque capacity TCL is torque capacity that is experimentally defined in advance such that the above excess torque brings the automatic clutch 14 into the slipping state. In addition, the limited torque capacity TCL does not always have to be the torque capacity TC1, which corresponds to the maximum torque TEmax of the engine 12 shown in FIG. 2, but may be set to a higher value or a lower value than that upon necessary.

Preferably, the torque capacity TC1, which corresponds to the maximum torque TEmax of the engine 12 from the relationship in FIG. 2, is used for the above limited torque capacity TCL, for example. In this case, when the input of the excess torque to the transmission 16 is predicted by the rotational acceleration determination means 100, the automatic clutch torque capacity control means 102 maintains the torque capacity TC of the automatic clutch 14 at the predetermined torque capacity TC1. At this time, the automatic clutch torque capacity control means 102 sets the clutch stroke SC to have a clutch stroke SC1, at which the torque capacity TC1 corresponding to the maximum torque of the engine 12 is obtained. For example, the automatic clutch torque capacity control means 102 executes feedback control such that the actual clutch stroke SC detected by the clutch stroke sensor 88 corresponds to the clutch stroke SC1.

FIG. 5 is a flowchart for illustrating main sections of control actuation of the automatic clutch 14 by the electronic control unit 80, that is, torque capacity control of the automatic clutch at the time when the input of the excess torque is predicted during the travel of the vehicle. This flowchart is repeatedly executed in a time cycle of approximately several msecs to several tens of msecs, for example.

First, in step S (hereinafter, step is omitted) that corresponds to the rotational acceleration determination means 100, from the rotational speed NIN (rpm) (the rotation angular speed a (rad/sec)) of the input shaft 42 of the transmission 16, which is detected by the input shaft rotational speed sensor 84, the rotational acceleration d(NIN)/dt (rotational angular acceleration de/dt) of the input shaft 42 as a time rate of change thereof is computed. Then, it is determined whether the absolute value of the rotational acceleration d(NIN)/dt of the input shaft 42 is at least equal to the threshold A, which is set in advance.

If a negative determination is made in above S1, the input of the excess torque is not predicted. Accordingly, in S2 that corresponds to the automatic clutch torque capacity control means 102, the automatic clutch 14 is controlled to have the normal torque capacity. In other words, in S2, in the case where a command value for disengaging the automatic clutch 14 is output from the electronic control unit 80, the clutch stroke SC of the automatic clutch 14 is set to be at least equal to SC2 so that the torque capacity thereof becomes zero. Alternatively, in the case where a command value for engaging the automatic clutch 14 is output from the electronic control unit 80, the clutch stroke SC of the automatic clutch 14 is changed toward zero at a specified speed so that the torque capacity thereof obtains the maximum value.

If a positive determination is made in above S1, the input of the excess torque to the transmission 16 from the front wheels (the drive wheels) 64L, 64R is predicted. Accordingly, in S3 that corresponds to the automatic clutch torque capacity control means 102, the torque capacity of the automatic clutch 14 is controlled so as to suppress input of the excess torque. In other words, in S3, the torque capacity of the automatic clutch 14 is set to the limited torque capacity TCL, which is set in advance to bring the automatic clutch 14 into the slipping state by the increase in torque prior to the input of the excess torque. The limited torque capacity TCL is the torque capacity TC1 that corresponds to the maximum torque of the engine 12, for example.

As described above, according to this embodiment, the rotational acceleration determination means 100 determines whether the absolute value of the input shaft rotational acceleration d(NIN)/dt of the transmission 16 is at least equal to the predetermined threshold A, and the input of the excess torque is thereby predicted. When the input of the excess torque is predicted, the automatic clutch torque capacity control means 102 controls the torque capacity of the automatic clutch 14 such that the automatic clutch 14 is brought into the slipping state by the increase in torque prior to the above input of the excess torque. Just as described, when the input of the excess torque is predicted, the generation of the excess torque is suppressed by bringing the automatic clutch 14 into the slipping state. Therefore, the input of the excess torque from the front wheels (the drive wheels) 64L, 64R to the transmission 16 can be suppressed without increasing mass and cost of the vehicle.

According to this embodiment, when the input of the excess torque is predicted, the automatic clutch torque capacity control means 102 maintains the torque capacity of the automatic clutch 14 at the predetermined limited torque capacity TCL. Accordingly, the automatic clutch 14 is brought into the slipping state, and thus the generation of the excess torque is suppressed.

According to this embodiment, the limited torque capacity TCL is the value that is defined in such a manner as to correspond to the maximum torque TEmax of the engine 12. Accordingly, when the input of the excess torque is determined, the automatic clutch torque capacity control means 102 maintains the torque capacity of the automatic clutch 14 to the value that is defined in the manner to correspond to the maximum torque TEmax of the engine 12. Then, the automatic clutch 14 is brought into the slipping state. In this way, the input of the excess torque that is higher than the maximum torque TEmax of the engine 12 can be suppressed without increasing the mass and the cost of the vehicle. In addition, because the maximum torque TEmax can be input from the engine 12 to the transmission 16, acceleration performance of the vehicle can be maintained.

According to this embodiment, the transmission 16 is the constant-mesh transmission with parallel shafts, whose gear stage can be switched in accordance with the operation position of the manually operated shift lever 90. Accordingly, even when the excess torque is to be generated due to an erroneous operation of the clutch by a driver, the automatic clutch torque capacity control means 102 maintains the automatic clutch 14 to have the torque capacity, with which the automatic clutch 14 is brought into the slipping state by the excess torque. Therefore, the input of the excess torque to the transmission 16 can be suppressed without increasing the mass and the cost of the vehicle.

According to this embodiment, the threshold A may be selected from the plural types of the thresholds in accordance with the actual gear stage of the transmission. This has such an advantage that it is determined whether the absolute value of the input shaft rotational acceleration d(NIN)/dt of the transmission 16 is at least equal to the predetermined threshold A and thus the input of the excess torque is accurately determined at the time when the excess torque is determined.

According to this embodiment, the torque capacity of the automatic clutch 14 is controlled by the electric clutch actuator 34, which has the electric motor 31 and the output rod 33 driven by the electric motor 31. Accordingly, compared to a case where a hydraulic actuator, such as a hydraulic cylinder, is used, high responsiveness can be obtained when the electric clutch actuator 34 is used. Therefore, there is such an advantage that the automatic clutch 14 is promptly brought into the slipping state where the torque capacity thereof is reduced after the input of the excess torque is determined.

Figure 6:
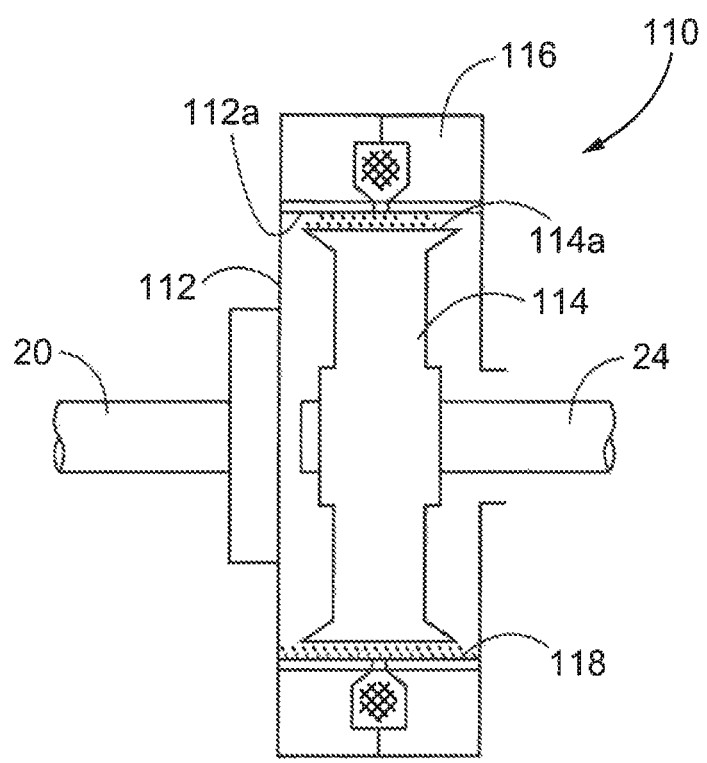
FIG. 6 is a schematic view of main sections of an automatic clutch in another configuration example that can be used by replacing the automatic clutch in FIG. 1.

FIG. 6 is a schematic view of main sections of an automatic clutch 110 in another configuration example that can be used by replacing the automatic clutch 14. The automatic clutch 110 in FIG. 6 is an electromagnetic clutch of a magnetic powder type and has: a first rotary member 112 in a circular container shape that is coupled to the crankshaft 20; and an outer circumferential surface 114a that opposes an inner circumferential surface 112a of the first rotary member 112 with a specified gap g being held therebetween. The automatic clutch 110 further includes: a disc-like second rotary member 114 that is coupled to the clutch output shaft 24; a ring-shaped electromagnet 116 that is fixed to an outer circumferential surface of the first rotary member 112; and magnetic powder 118 that is arranged in the gap g between the inner circumferential surface 112a and the outer circumferential surface 114a. In the automatic clutch 110 that is configured just as described, a magnetic force that is generated from the electromagnet 116 is increased in accordance with an excitation current that is supplied to the electromagnet 116. Accordingly, in accordance with the magnetic force, a magnetic binding force of the magnetic powder 118 between the inner circumferential surface 112a and the outer circumferential surface 114a as well as a mutual binding force of the magnetic powder 118 is increased. In this way, the torque capacity that corresponds to the excitation current is obtained. The first rotary member 112, the second rotary member 114, and the electromagnet 116 described above are each constructed of a magnetic material with a small quantity of residual magnetism, such as magnetic-pole steel known as silicon steel or electromagnetic steel, for example.

The embodiment of the disclosure has been described in detail so far on the basis of the drawings. The disclosure can also be applied to other aspects.

For example, the rotational acceleration determination means 100 of the above-described embodiment determines whether the input of the excess torque is predicted on the basis of the fact that the absolute value of the input shaft rotational acceleration d(NIN)/dt of the transmission 16 is at least equal to the predetermined threshold A. However, the rotational acceleration determination means 100 may determine whether the input of the excess torque is predicted by using an absolute value of the rotational acceleration of the wheels 64R, 64L. In this case, the determination is made on an upstream side when compared to the determination made by detection of the input shaft rotational acceleration. Thus, prediction accuracy of the input of the excess torque is improved. A threshold, which is used when the absolute value of the rotational acceleration of the wheels 64R, 64L is used, may be the same as the above threshold A or may be different from the threshold A. In addition, both of the absolute value of the input shaft rotational acceleration of the transmission 16 and the absolute value of the rotational acceleration of the wheels 64R, 64L may be used to determine whether the input of the excess torque is predicted.

The clutch actuator 34 of the automatic clutch 14 in the above-described embodiment is the electric actuator that includes the electric motor 31 and the output rod 33 driven by the electric motor 31. However, the clutch actuator 34 may be an electromagnetic actuator that drives the output rod 33 by a linear solenoid. In other words, a type of the actuator is not particularly limited. As long as an actuator is configured that displacement of a piston of the actuator can be controlled with accuracy and favorable responsiveness, the disclosure can be applied thereto.

In the above-described embodiment, it is configured that the output rod 33 of the clutch actuator 34 moves the release sleeve 38 via the release fork 36. However, the release fork 36 does not always have to be provided. For example, it may be configured that the clutch actuator 34 directly moves the release sleeve 38.

In the above-described embodiment, the transmission 16 is the constant-mesh transmission with parallel shafts. However, a type and a structure of the transmission 16 are not particularly limited as long as the transmission 16 is a transmission whose gear stage can be switched in response to the manual operation or can automatically be switched in accordance with a gear change determination.

In the above-described embodiment, the electronic control unit 80 executes the feedback control by detecting the clutch stroke SC of the release sleeve 38. However, even in the case where the electronic control unit 80 executes the control of the torque capacity on the basis of a stroke amount of the output rod 33 of the clutch actuator 34 instead of the clutch stroke SC of the release sleeve 38, the disclosure can be applied thereto.

Note that what has been described above is merely one embodiment and the disclosure can be implemented in aspects in which various modifications and improvements are made thereto based on knowledge of those skilled in the art.

What is claimed is:

1. A controller for a vehicle,
the vehicle including
an engine,
drive wheels, and
an automatic clutch and a transmission interposed in a power transmission route between the engine and the drive wheels,
the controller comprising
an electronic control unit configured to:
i) control torque transmitted between the engine and the transmission;
ii) determine at least one of whether a first absolute value is at least equal to a first threshold and whether a second absolute value is at least equal to a second threshold;
the first absolute value being an absolute value of rotational acceleration of an input shaft of the transmission, and the second absolute value being an absolute value of rotational acceleration of the drive wheels; and
iii) control torque capacity of the automatic clutch such that the automatic clutch is brought into a slipping state, when the electronic control unit determines that at least one of the first absolute value and the second absolute value is at least equal to an corresponding threshold.

2. The controller according to claim 1, wherein
the electronic control unit is configured to
maintain the torque capacity of the automatic clutch at limited torque capacity until at least one of the first absolute value and the second absolute value becomes smaller than the corresponding threshold, when the electronic control unit determines at least one of the first absolute value and the second absolute value is at least equal to the corresponding threshold.

3. The controller according to claim 1, wherein the electronic control unit is configured to select at least one of the first threshold and the second threshold from plural types of thresholds in accordance with an actual gear stage of the transmission.

4. A vehicle comprising:
an engine;
drive wheels;
an automatic clutch and a transmission interposed in a power transmission route between the engine and the drive wheels; and
an electronic control unit configured to:
i) control torque transmitted between the engine and the transmission;
ii) determine at least one of whether a first absolute value is at least equal to a first threshold and whether a second absolute value is at least equal to a second threshold, the first absolute value being an absolute value of rotational acceleration of an input shaft of the transmission, and the second absolute value being an absolute value of rotational acceleration of the drive wheels; and
iii) control torque capacity of the automatic clutch such that the automatic clutch is brought into a slipping state, when the electronic control unit determines that at least one of the first absolute value and the second absolute value is at least equal to an corresponding threshold.

5. The vehicle according to claim 4, wherein the transmission is a constant-mesh transmission with parallel shafts, and a gear stage of the constant-mesh transmission is switched in accordance with an operation position of a manually operated shift lever.

* * * * *